Figure 1:
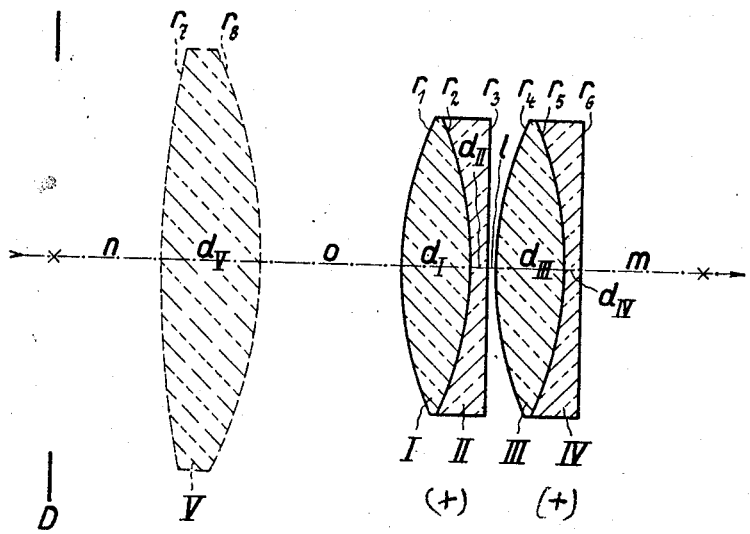

Jan. 1, 1924.

H. ERFLE 1,479,229

EYELENS SYSTEM

Filed Aug. 13, 1921

Inventor:
Heinrich Erfle

Patented Jan. 1, 1924.

1,479,229

UNITED STATES PATENT OFFICE.

HEINRICH ERFLE, OF JENA, GERMANY, ASSIGNOR TO THE FIRM OF CARL ZEISS, OF JENA, GERMANY.

EYELENS SYSTEM.

Application filed August 13, 1921. Serial No. 492,112.

(GRANTED UNDER THE PROVISIONS OF THE ACT OF MARCH 3, 1921, 41 STAT. L., 1313.)

*To all whom it may concern:*

Be it known that I, HEINRICH ERFLE, a citizen of the German Empire, residing at Jena, Germany, have invented a new and useful Eyelens System (for which I have filed an application in Germany, November 23, 1917; England, June 5, 1920; and France, July 2, 1920, Patent No. 518728), of which the following is a specification.

The present invention relates to four member eye-lens systems in which every two members, one made of glass of smaller and one of glass of greater refractive index, are cemented together. According to the invention these systems are so arranged that the cemented surfaces always turn their respective concave side towards the incident light, and that of each pair of lenses that lens which consists of glass of smaller refractive index faces the incident light, and, in addition, the radius of at least one of the two cemented surfaces is so chosen that it amounts to no less than six tenths of the whole focal length of the eye-lens system, and to no more than two and a half times that length. In this manner a system is obtained, in which the angles of incidence of the rays of light even in the case of comparatively large angles of the field of view, extending to about 70°, become in no place excessively large, so that with systems corresponding to the invention, even in the case of such large angles of the field of view, in addition to a good correction of the chromatic aberrations a correction of the astigmatism and of the distortion as well as of the spherical aberrations may in a sufficient measure be attained. Moreover, the dimensions may be chosen in such a manner that even in the case of these large angles of the field of view the the distance from the exit pupil to the last lens vertex does not come below the desirable amount. Besides, in the place of a cemented surface a pair of uncemented surfaces might be used as well, if equivalent to the said surface, which may generally be considered to be the case, if its refractive power (i. e., the total of the refractive powers of the two surfaces) does not exceed one fifth of the whole power of the eye-lens system. Which value would in this case have to stand for the radius of the cemented surface, may be elucidated in the following. The radius of the cemented surface may be marked R, the radius of the first surface of an uncemented pair of surfaces $R_1$, and that of the second surface, $R_2$. Furthermore, the refractive index of the first lens may be designated $n_1$, and that of the second lens, $n_2$. In the event of two members being cemented together, the refractive power of the cemented surface is then $$\frac{n_2 - n_1}{R}.$$

If the two members of a pair be not cemented together but optically united with an air-space, the refractive power of the pair of surfaces equivalent to the cemented surface is $$\frac{1 - n_1}{R_1} + \frac{n_2 - 1}{R_2}.$$

If in both cases the effect is to be the same, the two refractive powers indicated must be alike, i. e., it must be $$\frac{n_2 - n_1}{R} = \frac{1 - n_1}{R_1} + \frac{n_2 - 1}{R_2}.$$

The value deduced from this equation $$R = \frac{n_2 - n_1}{\frac{1 - n_1}{R_1} + \frac{n_2 - 1}{R_2}}$$

would, in the case of the lenses not being cemented together, have to stand for the value designated in the foregoing and hereinafter as the radius of the cemented surface.

The eye-lens systems corresponding to the invention, especially in the case of large angles of the field of view, are in a suitable manner used in connection with a collective system, for which as a rule a single, i. e., uncemented lens will suffice. This collective system may be located either in front of the focal point of an objective system or behind it, in which manner the eye-lens system then forms part of an ocular of the Huygens or Ramsden type.

A diminution of the defects of the images may be obtained in a particularly high degree, by having the lenses so dimensioned that the total of the refractive powers of all collective surfaces amounts to at least one and a half times the total of the refractive powers of all dispersive surfaces.

At last it may be observed that for the eye-lens systems corresponding to the invention the possibility arises to give that member of each pair of lenses which consists of glass of smaller refractive index, and which in each case is formed by a collective lens, the same radius of curvature on both sides or, indeed, to have both pairs of lenses completely identical; whereby both pairs of lenses may be rendered wholly identical. Systems corresponding to the invention therefore entail the additional advantage that they may be manufactured with facility.

A four-member eye-lens system, in which every two members, one of glass of smaller and one of glass of greater refractive index, are joined in a cemented surface turning its concave side towards the incident light, and in which the cemented pairs of lenses are so disposed that in each case the member consisting of glass of smaller refractive index faces the incident light, is represented for instance, in the patent specification 828511. Details as regards the dimensions of the lenses, and as to the kinds of glasses used for their manufacture, have, however, not become known for such systems.

In the annexed drawing and in the following tables four eye-lens systems corresponding to the invention are shown by way of example, each of which system, together with a field lens, is to form an ocular. The radii, thicknesses, and distances stated relate in every case to a whole focal length of the eye-lens system amounting to 100 units. The kinds of glass used are characterized by their refractive index for sodium light $n_D$, and by their reciprocal power of dispersion $\nu$. In the first example, in which the eye-lens system, the same as in the fourth example, consists of two pairs of lenses completely agreeing as regards their dimensions, and as to the kinds of glass, the field lens has been stated (indicated in dotted lines), this has, however, not been done in the remaining examples.

*Example 1 (Fig. 1).*

Radii.       Thicknesses and distances.
$r_1 = r_4 = +93.6$   $d_I = d_{III} = 18.5$
$r_2 = r_5 = -93.6$   $d_{II} = d_{IV} = 4.1$
$r_3 = r_6 = +2550$   $l = 0.19$

*Kinds of glass.*

| I and III. | II and IV. |
|---|---|
| $n_D$ 1.5399 | 1.6202 |
| $\nu$ 59.4 | 36.2 |

For the field lens, with which the aforesaid eye-lens system is to be united in an ocular, the corresponding values would be as follows:

$r_7 = +269.0$   $r_8 = -125.9$   $d_V = 25.1$
$n_D = 1.5163$   $\nu = 64.0$

Moreover, arrangements would have to be made, that the distance between the front lens of the eye-lens system and the field lens, $o = 36.5$, and that $n$, denoting the distance from the field lens to the diaphragm of the field of view, which diaphragm is marked D, and indicates the front focal plane, amounts to 28.0. The distance $m$ from the exit pupil to the last lens vertex of the eye-lens system amounts in this system to 31.7.

Figures 2, 3, 4:
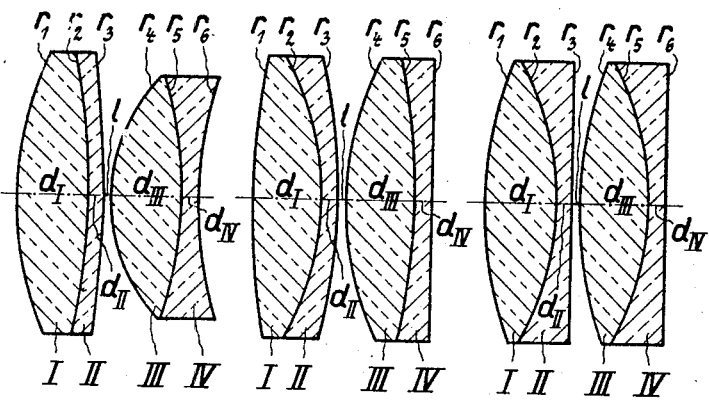

*Example 2 (Fig. 2).*

Radii.            Thicknesses and distances.
$r_1 = + 88.13$   $d_I = d_{III} = 18.4$
$r_2 = -178.68$   $d_{II} = d_{IV} = 4.0$
$r_3 = +739.48$   $l = 0.2$
$r_4 = + 44.96$
$r_5 = -178.68$
$r_6 = +104.96$

*Kinds of glass.*

| I and III. | II and IV. |
|---|---|
| $n_D = 1.5163$ | 1.6489 |
| $\nu = 64.0$ | 33.8 |

*Example 3 (Fig. 3).*

Radii.             Thicknesses and distances.
$r_1 = + 204.68$   $d_I = d_{III} = 18.6$
$r_2 = - 74.21$    $d_{II} = d_{IV} = 4.1$
$r_3 = - 151.75$   $l = 0.2$
$r_4 = + 84.4$
$r_5 = - 148.42$
$r_6 = 6774.8$

*Kinds of glass.*

| I and III. | II and IV. |
|---|---|
| $n_D = 1.5163$ | 1.6489 |
| $\nu = 64.0$ | 33.8 |

*Example 4 (Fig. 4).*

Radii.                 Thicknesses and distances.
$r_1 = r_4 = + 102.95$   $d_I = d_{III} = 18.5$
$r_2 = r_5 = - 72.97$    $d_{II} = d_{IV} = 4.0$
$r_3 = r_6 = +16858.9$   $l = 0.2$

*Kinds of glass.*

| I and III. | II and IV. |
|---|---|
| $n_D = 1.5726$ | 1.6031 |
| $\nu = 57.5$ | 36.9 |

I claim:

1. Eye-lens system consisting of four members, in which every two members, one of glass of smaller, and one of glass of greater refractive index, are joined in a cemented surface turning its concave side towards the incident light, and in which the cemented pairs of lenses are so disposed, that in each case the member consisting of glass of smaller refractive index faces the incident light, the radius of at least one of the cemented surfaces amounting to no less than six tenths of the whole focal length of the eye-lens system, and to no more than two and a half times that length.

2. Eye-lens system consisting of four members, in which every two members, one of glass of smaller, and one of glass of greater refractive index, are joined in a cemented surface turning its concave side towards the incident light, and in which the cemented pairs of lenses are so disposed, that in each case the member consisting of glass of smaller refractive index faces the incident light, the radius of at least one of the cemented surfaces amounting to no less than six tenths of the whole focal length of the eye-lens system, and to no more than two and a half times that length, and the total of the refractive powers of all collective surfaces amounting to at least one and a half times the absolute value of the total of the refractive powers of all dispersive surfaces.

3. Eye-lens system consisting of four members, in which every two members, one of glass of smaller, and one of glass of greater refractive index, the members consisting of glass of smaller refractive index having each on both sides the same radius of curvature, are joined in a cemented surface turning its concave side towards the incident light, and in which the cemented pairs of lenses are so disposed, that in each case the member consisting of glass of smaller refractive index faces the incident light, the radius of at least one of the cemented surfaces amounting to no less than six tenths of the whole focal length of the eye-lens system, and to no more than two and a half times that length.

4. Eye-lens system consisting of four members, in which every two members, one of glass of smaller, and one of glass of greater refractive index, are joined in a cemented surface turning its concave side towards the incident light, and in which the cemented pairs of lenses are identical and so disposed, that in each case the member consisting of glass of smaller refractive index faces the incident light, the radius of at least one of the cemented surfaces amounting to no less than six tenths of the whole focal length of the eye-lens system, and to no more than two and a half times that length.

HEINRICH ERFLE.

Witnesses:
 PAUL KRÜGER,
 RICHARD HELM.